United States Patent
Chen

(10) Patent No.: US 9,973,077 B2
(45) Date of Patent: May 15, 2018

(54) DELTA CONVERSION RECTIFIER

(71) Applicant: SCHNEIDER ELECTRIC IT CORPORATION, West Kingston, RI (US)

(72) Inventor: Hui Jung Chen, New Taipei (TW)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 406 days.

(21) Appl. No.: 14/469,877

(22) Filed: Aug. 27, 2014

(65) Prior Publication Data

US 2016/0065056 A1    Mar. 3, 2016

(51) Int. Cl.
*H02M 5/42* (2006.01)
*H02M 1/42* (2007.01)
(Continued)

(52) U.S. Cl.
CPC ....... *H02M 1/4233* (2013.01); *H02M 1/4216* (2013.01); *H02M 5/4585* (2013.01);
(Continued)

(58) Field of Classification Search
CPC ............. H02M 1/4233; H02M 1/4208; H02M 1/4225; H02M 3/33592; H02M 7/217
(Continued)

(56) References Cited

U.S. PATENT DOCUMENTS 5,502,630 A    3/1996  Rokhvarg
5,686,768 A *  11/1997  Thomsen ................ H02J 9/062
                                                              307/64
(Continued)

FOREIGN PATENT DOCUMENTS

CN    103427481 A    12/2013
EP      2020725 A2    2/2009
(Continued)

OTHER PUBLICATIONS

Pires, Vitor Fernao et al., "Single-Stage Double-Buck Topologies with High Power Factor", Journal of Power Electronics vol. 11, No. 5, Sep. 2011, pp. 655-661.
(Continued)

*Primary Examiner* — Adolf Berhane
*Assistant Examiner* — Afework Demisse
(74) *Attorney, Agent, or Firm* — Lando & Anastasi, LLP

(57) ABSTRACT

According to one aspect, embodiments of the invention provide an AC-DC rectifier comprising an input configured to receive input AC power from an AC power source having an input AC voltage waveform, an output configured to provide output DC power to a load, an active power filter coupled to the input, an inverter coupled to the input and configured to convert the input AC voltage waveform into an output AC voltage waveform at a desired magnitude, a rectifier portion coupled between the inverter and the output and configured to convert the output AC voltage waveform into the output DC power, and a controller coupled to the active power filter and the inverter and configured to operate the active power filter to provide Power Factor Correction (PFC) at the input and to operate the inverter to provide the output AC voltage waveform at the desired magnitude to the rectifier portion.

17 Claims, 6 Drawing Sheets

(51) Int. Cl.
    *H02M 5/458*     (2006.01)
    *H02M 7/06*     (2006.01)
    *H02M 1/00*     (2006.01)

(52) U.S. Cl.
    CPC ........ *H02M 7/06* (2013.01); *H02M 2001/007* (2013.01); *Y02B 70/126* (2013.01)

(58) Field of Classification Search
    USPC .......................................................... 363/89
    See application file for complete search history.

(56) References Cited

U.S. PATENT DOCUMENTS

| | | | |
|---|---|---|---|
| 7,209,374 | B2 | 4/2007 | Noro |
| 8,169,804 | B2 * | 5/2012 | Tan ................... H02M 1/4216 363/65 |
| 8,487,546 | B2 | 7/2013 | Melanson |
| 8,503,199 | B1 | 8/2013 | Chapuis et al. |
| 8,674,605 | B2 | 3/2014 | Puvanakijjakorn et al. |
| 9,093,919 | B2 * | 7/2015 | Chapman ................. H02J 3/38 |
| 2001/0033507 | A1 | 10/2001 | Li et al. |
| 2002/0118556 | A1 | 8/2002 | Johnson |
| 2002/0149953 | A1 * | 10/2002 | Smedley ................... H02J 3/01 363/84 |
| 2006/0132111 | A1 | 6/2006 | Jacobs et al. |
| 2007/0069581 | A1 | 3/2007 | Mino |
| 2008/0297248 | A1 | 12/2008 | Honda |
| 2009/0268496 | A1 | 10/2009 | Tan et al. |
| 2009/0303762 | A1 | 12/2009 | Jang et al. |
| 2011/0002148 | A1 | 1/2011 | Iturriz et al. |
| 2012/0024299 | A1 | 2/2012 | Scheu |
| 2012/0182775 | A1 | 7/2012 | Tan et al. |
| 2012/0242299 | A1 | 9/2012 | Xu et al. |
| 2012/0249038 | A1 | 10/2012 | Wei et al. |
| 2012/0320641 | A1 * | 12/2012 | Chapman ................ H02J 3/383 363/37 |
| 2013/0278224 | A1 * | 10/2013 | Ofek ..................... H02M 7/219 320/137 |
| 2014/0117867 | A1 | 5/2014 | Elferich et al. |
| 2014/0125241 | A1 | 5/2014 | Elferich et al. |
| 2015/0036389 | A1 | 2/2015 | Freeman et al. |
| 2015/0295494 | A1 | 10/2015 | Gong |

FOREIGN PATENT DOCUMENTS

| | | |
|---|---|---|
| EP | 2405562 A1 | 1/2012 |
| JP | 2001197757 A | 7/2001 |
| WO | 2007105613 A1 | 9/2007 |
| WO | 2013/130054 A1 | 9/2013 |

OTHER PUBLICATIONS

Extended European Search Report from corresponding European Application No. 16172959.5 dated Nov. 14, 2016.

* cited by examiner

DELTA CONVERSION RECTIFIER

BACKGROUND OF INVENTION

1. Field of Invention

The present invention relates generally to systems and methods for providing AC to DC rectification.

2. Discussion of Related Art

AC-DC rectifiers are commonly used in a variety of applications to convert supplied AC power into DC power having a desired voltage level. For example, AC-DC rectifiers are often used as chargers or front end converters in high frequency isolated Uninterruptible Power Supply (UPS) systems, in telecommunication systems for providing desired DC voltage (e.g., 48V) to a distribution bus, and in High Voltage Direct Current (HVDC) datacenter power supplies to provide desired DC voltage (e.g., 240V or 380V) to a distribution bus.

SUMMARY

At least one aspect of the invention is directed to an AC-DC rectifier comprising an input configured to be coupled to an AC power source and to receive input AC power from the AC power source having an input AC voltage waveform, an output configured to provide output DC power to a load, an active power filter coupled to the input, an inverter coupled to the input and configured to convert the input AC voltage waveform into an output AC voltage waveform at a desired magnitude, a rectifier portion coupled between the inverter and the output and configured to convert the output AC voltage waveform into the output DC power, and a controller coupled to the active power filter and the inverter and configured to operate the active power filter to provide Power Factor Correction (PFC) at the input and to operate the inverter to provide the output AC voltage waveform at the desired magnitude to the rectifier portion.

According to one embodiment, the input is further configured to be coupled to a 3-phase AC power source and to receive one phase of 3-phase power provided by the 3-phase AC power source.

According to another embodiment, the active power filter is a full-bridge active power filter including a first plurality of switches. In one embodiment, the inverter is a full-bridge inverter including a second plurality of switches. In another embodiment, at least one switch of the first plurality of switches is also included in the second plurality of switches.

According to one embodiment, the controller is coupled to the input and is further configured to monitor a magnitude of the input AC voltage waveform and compare the magnitude of the input AC voltage waveform to the desired magnitude of the output AC voltage waveform. In one embodiment, the controller is further configured to operate the inverter in a buck mode of operation in response to a determination that the magnitude of the input AC voltage waveform is greater than the desired magnitude of the output AC voltage waveform. In another embodiment, the controller is further configured to operate the inverter in a boost mode of operation in response to a determination that the magnitude of the input AC voltage waveform is less than the desired magnitude of the output AC voltage waveform.

According to another embodiment, the controller is further configured to operate the active power filter to maintain sinusoidal current at the input. In one embodiment, the AC-DC rectifier further comprises a capacitor coupled in parallel with the inverter. In another embodiment, the rectifier portion is further configured to be coupled to a DC bus of a UPS.

Another aspect of the invention is directed to a method for operating an AC-DC rectifier, the AC-DC rectifier comprising an input configured to be coupled to an AC power source and an output configured to provide output DC power to a load, the method comprising acts of receiving, at the input from the AC power source, input AC power having an input AC voltage waveform, controlling, with an active power filter, current at the input to provide PFC, converting, with an inverter, the input AC voltage waveform into an output AC voltage waveform at a desired magnitude, and rectifying the output AC voltage waveform into the output DC power.

According to one embodiment, the AC power source is a 3-phase power source, and wherein the act of receiving input AC power includes receiving one phase of 3-phase power provided by the 3-phase power source.

According to another embodiment, the active power filter is a full-bridge active power filter including a plurality of switches, and wherein the act of controlling current at the input includes adjusting a duty ratio of at least one switch of the plurality of switches to draw desired current from the AC power source. In one embodiment, the act of adjusting the duty ratio of at least one switch of the plurality of switches includes adjusting the duty ratio of the at least one switch of the plurality of switches to maintain sinusoidal current at the input.

According to one embodiment, the inverter is a full-bridge inverter including a plurality of switches, and wherein the act of converting the input AC voltage waveform into the output AC voltage waveform includes adjusting a duty ratio of at least one switch of the plurality of switches to generate the output AC voltage waveform at the desired magnitude.

According to another embodiment, the method further comprises monitoring a magnitude of the input AC voltage waveform, and comparing the magnitude of the input AC voltage waveform to the desired magnitude of the output AC voltage waveform. In one embodiment, the act of converting the input AC voltage waveform into the output AC voltage waveform includes operating the plurality of switches in a boost mode of operation in response to a determination that the magnitude of the input AC voltage waveform is less than the desired magnitude of the output AC voltage waveform. In another embodiment, the act of converting the input AC voltage waveform into the output AC voltage waveform includes operating the plurality of switches in a buck mode of operation in response to a determination that the magnitude of the input AC voltage waveform is greater than the desired magnitude of the output AC voltage waveform.

At least one aspect of the invention is directed to an AC-DC rectifier comprising a plurality of rectifier sections, each configured to receive AC power from one phase of a 3-phase AC power source, each rectifier section comprising an input configured to receive one phase of the 3-phase AC power having an input AC voltage waveform, and means for providing PFC at the input and for converting the input AC voltage waveform into an output AC voltage waveform at a desired magnitude, an output configured to provide output DC power to a load, and a rectifier portion coupled to the output and configured to convert the output AC voltage waveform from each one of the plurality of rectifier sections into the output DC power.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
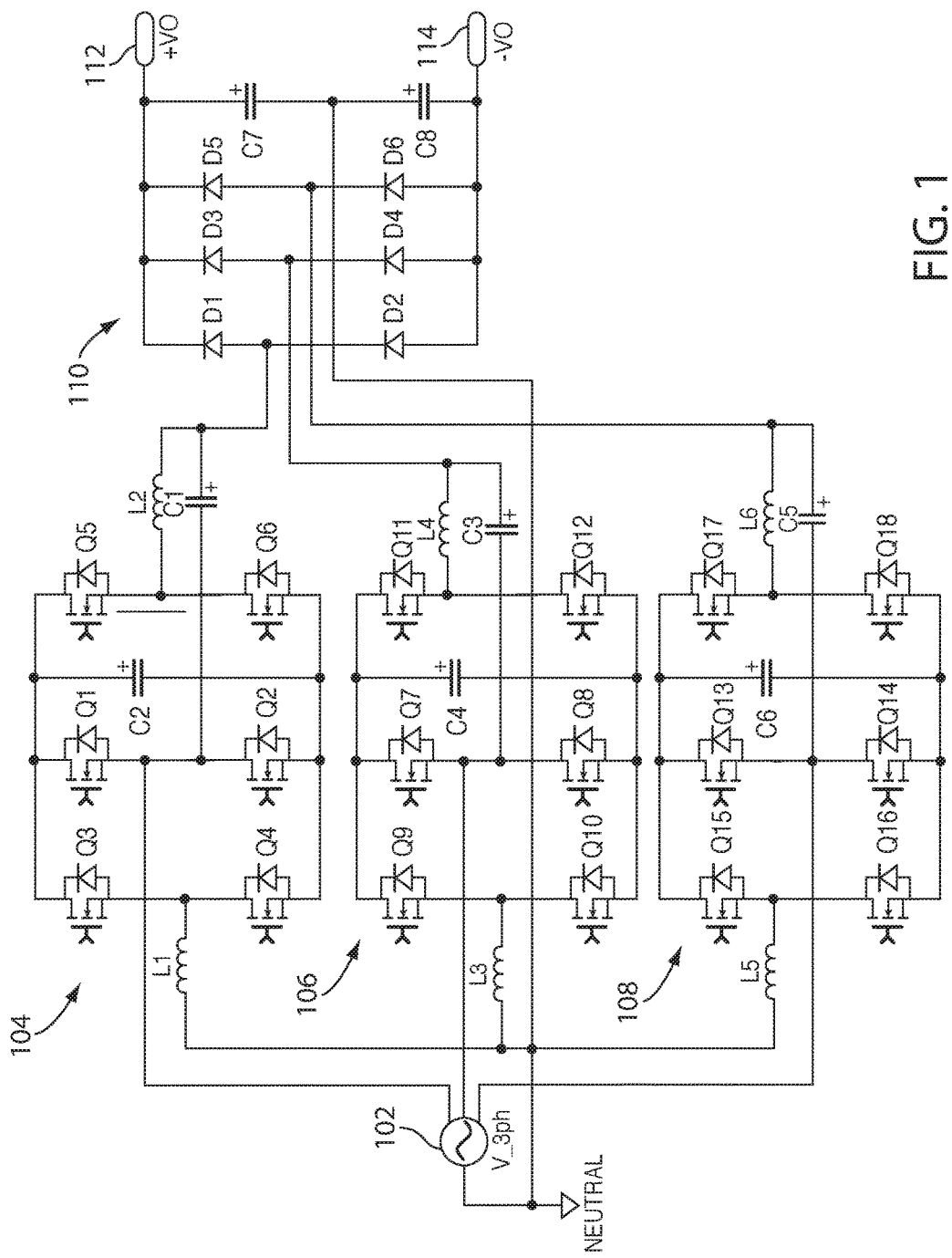
FIG. 1 is a circuit diagram of a 3-phase transformer-less delta conversion rectifier according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, AC-DC rectifiers are commonly used in a variety of different applications. Some common rectifier systems for providing regulated DC output voltage from an AC input voltage source include a combination buck converter and boost converter. The combination buck and boost converter operates as a buck converter when the input voltage is higher than the regulated output voltage and as a boost converter when the input voltage is lower than the regulated output voltage.

Typical combination buck and boost converters may be configured in either a buck-boost configuration or a boost-buck configuration. One disadvantage with a buck-boost configuration is that in a buck mode, the converter draws pulsating current from the input voltage source. As a result, relatively large and bulky Electromagnetic Interference (EMI) filters are typically required in such a converter to comply with regulatory standards when the input voltage source is AC mains. One disadvantage with a common boost-buck configuration is that the boost converter and the buck converter must both operate at a high switching frequency. Such continuous double conversion (i.e., through both the boost converter and the buck converter) may be relatively inefficient.

One common solution for the pulsating current and double conversion problems of a combination buck and boost converter discussed above is to utilize a transformer-based delta conversion UPS. A transformer-based delta conversion UPS derives power directly from the input voltage source and generates a delta voltage source between the input voltage source and the output of the converter, thereby providing regulated output voltage. One disadvantage with a transformer-based delta conversion UPS is that is requires a line frequency transformer which is typically large and bulky.

Accordingly, in at least one embodiment, a transformer-less delta conversion rectifier is provided that avoids the bulky EMI filter, double conversion, and bulky line frequency transformer problems discussed above.

FIG. 1 is a circuit diagram of a 3-phase transformless delta conversion rectifier 100. The rectifier 100 includes a first rectifier section 104, a second rectifier section 106, a third rectifier section 108, and a rectifier 110. Each rectifier section 104-108 has an input coupled to one phase of the three-phase AC power source 102 and an output coupled to the rectifier 110. The rectifier 110 is also coupled to a positive output 112 and a negative output 114.

The three-phase AC power source 102 provides 3-phase power to the rectifier 100. Each rectifier section 104-108 receives one phase of the 3-phase AC power from the power source 102 and converts AC voltage at its input into regulated AC voltage. In addition to generating regulated AC voltage, each rectifier section 104-108 is also configured to provide Power Factor Correction (PFC) at its input. The regulated AC voltage from each rectifier section 104-108 is provided to the rectifier 110. The rectifier 110 converts the regulated AC voltage received from the rectifier sections 104-108 into regulated DC voltage. The regulated DC voltage is provided to a load via the positive and negative outputs 112, 114. By operating each rectifier section 104-108 to provide desired AC voltage to the rectifier 110, the DC voltage output by the rectifier 110 is also controlled.

Each rectifier section 104-18 is substantially the same and operates on its corresponding phase received from the power source 102 in substantially the same way. The rectifier 100 is discussed in greater detail below with regard to a single rectifier section operating on a single phase from the power source 102.

Figure 2:
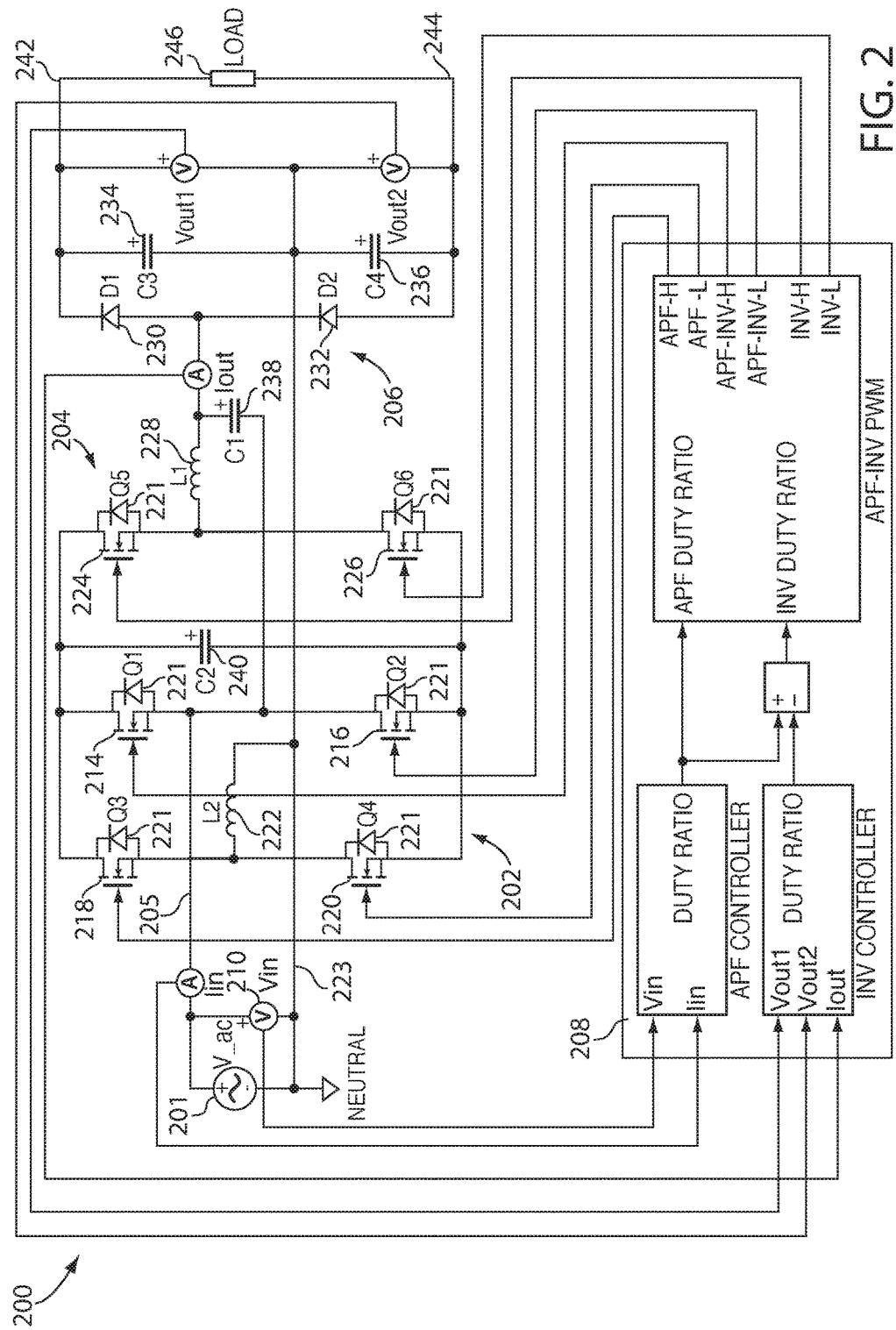
FIG. 2 is a circuit diagram of a single phase transformer-less delta conversion rectifier according to aspects of the current invention.

FIG. 2 is a single phase transformer-less delta conversion rectifier 200 (e.g., the first rectifier section 104 of the rectifier 100 shown in FIG. 1) according to aspects of the current invention. The rectifier 200 includes an active power filter 202, an inverter 204, a rectifier 206, and a controller 208. The active power filter 202 includes a first switch (Q1) 214, a second switch (Q2) 216, a third switch (Q3) 218, a fourth switch (Q4) 220, and a first inductor 222. The inverter 204 includes the first switch (Q1) 214, the second switch (Q2) 216, a fifth switch (Q5), a sixth switch (Q6) 226, and a second inductor 228. The rectifier 206 includes a diode bridge (including a first diode 230 and a second diode 232), a first capacitor 234, and a second capacitor 236. In one embodiment, each switch (Q1-Q6) 214-226 is a Metal-Oxide-Semiconductor Field-Effect Transistor (MOSFET); however, in other embodiments, other appropriate types of switches may be utilized. Each switch (Q1-Q6) 214-226 also includes a diode 221 coupled between its drain and source.

The source of the first switch (Q1) 214 is coupled to an AC power source 201 (e.g., the power source 102 shown in FIG. 1) and to the drain of the second switch (Q2) 216. The drain of the first switch (Q1) 214 is coupled to the drain of the third switch (Q3) 218 and the drain of the fifth switch (Q5) 224. The source of the third switch (Q3) 218 is coupled to the drain of the fourth switch (Q4) 220. The source of the fifth switch (Q5) 224 is coupled to the drain of the sixth switch (Q6) 226. The source of the second switch (Q2) 216 is coupled to the source of the fourth switch (Q4) 220 and the source of the sixth switch (Q6) 226. The first inductor 222 is coupled between the source of the third switch (Q3) 218 and a neutral line 223. A first terminal of the second inductor 228 is coupled to the source of the fifth switch (Q5) 224 and a second terminal of the second inductor 228 is coupled to the source of the first switch (Q1) 214 via a third capacitor 238. A fourth capacitor 240 is coupled between the drain of the first switch (Q1) 214 and the source of the second switch (Q2) 216.

The anode of the first diode 230 is coupled to the second terminal of the second inductor 228. The cathode of the first diode 230 is coupled to a positive output 242. A cathode of the second diode 232 is coupled to the second terminal of the second inductor 228. The anode of the second diode 232 is coupled to a negative output 244. The first capacitor 234 is coupled between the positive output 242 and the neutral line 223. The second capacitor 236 is coupled between the negative output 244 and the neutral line 223. A load 246 may be coupled to the positive output 242 and the negative output 246.

The controller 208 is coupled to a voltage sensor that is coupled between the input 205 of the rectifier 200 and the neutral line 22 and to a current sensor that is coupled between the AC power source 201 and the active power filter 202. The controller 208 is also coupled to a voltage sensor that is coupled between the positive output 242 and the neutral line 223, to a voltage sensor that is coupled between the negative output 244 and the neutral line 223, and to a current sensor that is coupled between the inverter 204 and the rectifier 206. The controller 208 is also coupled to the gate of each switch (Q1-Q6) 214-226.

The power source 201 provides input AC power (e.g., one phase of 3-phase power), having a sinusoidal input voltage waveform, to the active power filter 202 and the inverter 204. According to one embodiment, the sinusoidal input voltage waveform has a frequency of 50 Hz or 60 Hz and a magnitude of 230 Vac (±15%); however, in other embodiments, the sinusoidal input voltage waveform may be configured differently.

The active power filter 202 operates to provide PFC at its input. The inverter 204 operates to provide regulated AC voltage (i.e., a regulated output voltage waveform) at its output (i.e., to the rectifier 206). For example, in one embodiment, the controller 208 monitors characteristics of the rectifier 200 such as the input voltage 210 at the input 205 of the rectifier 200, the input current from the power source 201 to the rectifier 200, the positive output voltage of the rectifier 206 between the positive output 242 and the neutral line 223, the negative output voltage of the rectifier 206 between the negative output 244 and the neutral line, and the output current from the inverter 204 to the rectifier 206. In other embodiments, the controller 208 may monitor any other appropriate characteristics of the rectifier 200.

Based on the monitored characteristics of the rectifier 200, the controller 208 operates the active power filter 202 to provide PFC at the input 205 of the rectifier 200. To operate the active power filter 202, the controller 208 sends control signals to the gates of the switches (Q1-Q4) 214-220 of the active power filter 202 to control the duty cycle of each switch (Q1-Q4) 214-220. Also based on the monitored characteristics of the rectifier 200, the controller 208 operates the inverter 204 to convert input AC voltage at the input 205 into regulated output AC voltage at a desired magnitude. In one embodiment, the regulated output AC voltage waveform has a frequency of 50 Hz or 60 Hz and amplitude of +190 Vdc during a positive half cycle and −190 Vdc during a negative half cycle; however, in other embodiments, the regulated output voltage waveform may be configured differently. To operate the inverter 204, the controller 208 sends control signals to the gates of the switches (Q1, Q2, Q5, Q6) 214, 216, 224, 226 of the inverter 204 to control the duty cycle of each switch (Q1, Q2, Q5, Q6) 214, 216, 224, 226.

The regulated AC voltage from the inverter 204 is provided to the rectifier 206. The rectifier converts the regulated AC voltage into regulated DC voltage and provides the regulated DC voltage to a load 246 coupled to the positive output 242 and the negative output 244. In one embodiment, where the regulated output AC voltage waveform has amplitude of +190 Vdc during a positive half cycle and −190 Vdc during a negative half cycle, the regulated DC voltage provided to the load 246 is 380 Vdc (i.e., +190 Vdc provided to the positive output 242 and −190 Vdc provided to the negative output 244); however, in other embodiments, the regulated DC voltage may be configured differently.

By controlling the inverter to generate regulated AC voltage at a desired magnitude at the output of the inverter 204, the regulated DC voltage provided by the rectifier 206 to the load 246 is also controlled. Operation of the active power filter 202 and the inverter 204 are discussed in greater detail below.

Figure 3:
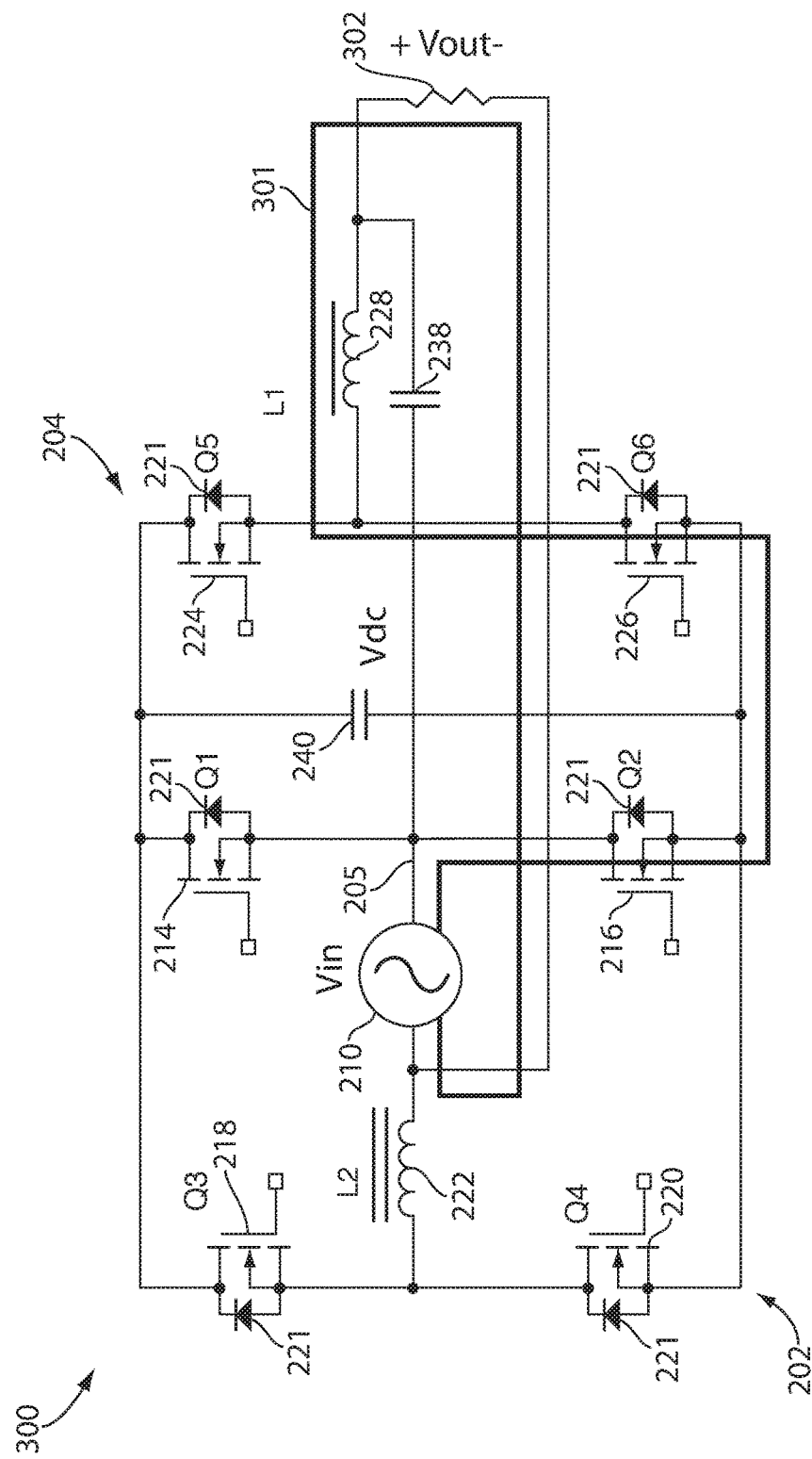
FIG. 3 is an equivalent circuit diagram of a single phase transformer-less delta conversion rectifier in a first mode of operation according to aspects of the current invention.

FIG. 3 is an equivalent circuit diagram 300 of the single phase transformer-less delta conversion rectifier 200 in a first mode of operation according to aspects of the current invention. The equivalent circuit diagram 300 includes the active power filter 202 and the inverter 204, as discussed above. The circuit diagram 300 also includes the input voltage ($V_{in}$) 210 at the input 205 of the rectifier 200 and a load 302. In one embodiment, the load 302 includes the load placed on the rectifier 200 by the rectifier 206 and the load 246. As the power source 201 provides power to the rectifier 200, the controller 208 monitors characteristics of the rectifier 200 and, based on the monitored characteristics, operates the active power filter 202 to provide PFC at the input 205 of the rectifier 200 and the inverter 204 to provide regulated output AC voltage ($V_{out}$) 303 to the load 302.

In response to a determination, by the controller 208, that the input voltage 210 (i.e., the sinusoidal input voltage waveform) is negative and at the same magnitude as a desired output voltage waveform of the inverter 204, the controller 208 transmits signals (e.g., low signals) to switches Q1 214 and Q5 224 to turn the switches off and transmits signals (e.g., high signals) to switches Q2 216 and Q6 226 to turn the switches on. As shown by the solid line 301 in FIG. 3, once switches Q2 216 and Q6 226 are turned on, the negative input voltage 210 is provided directly to the load 302 as the desired output voltage 303. The return path from the load to the input voltage 210 is provided by the second inductor 228 and switches Q2 216 and Q6 226. Because the input voltage 210 is provided directly to the load 302, operation of the active power filter 202 to provide PFC may be unnecessary.

Figure 4:
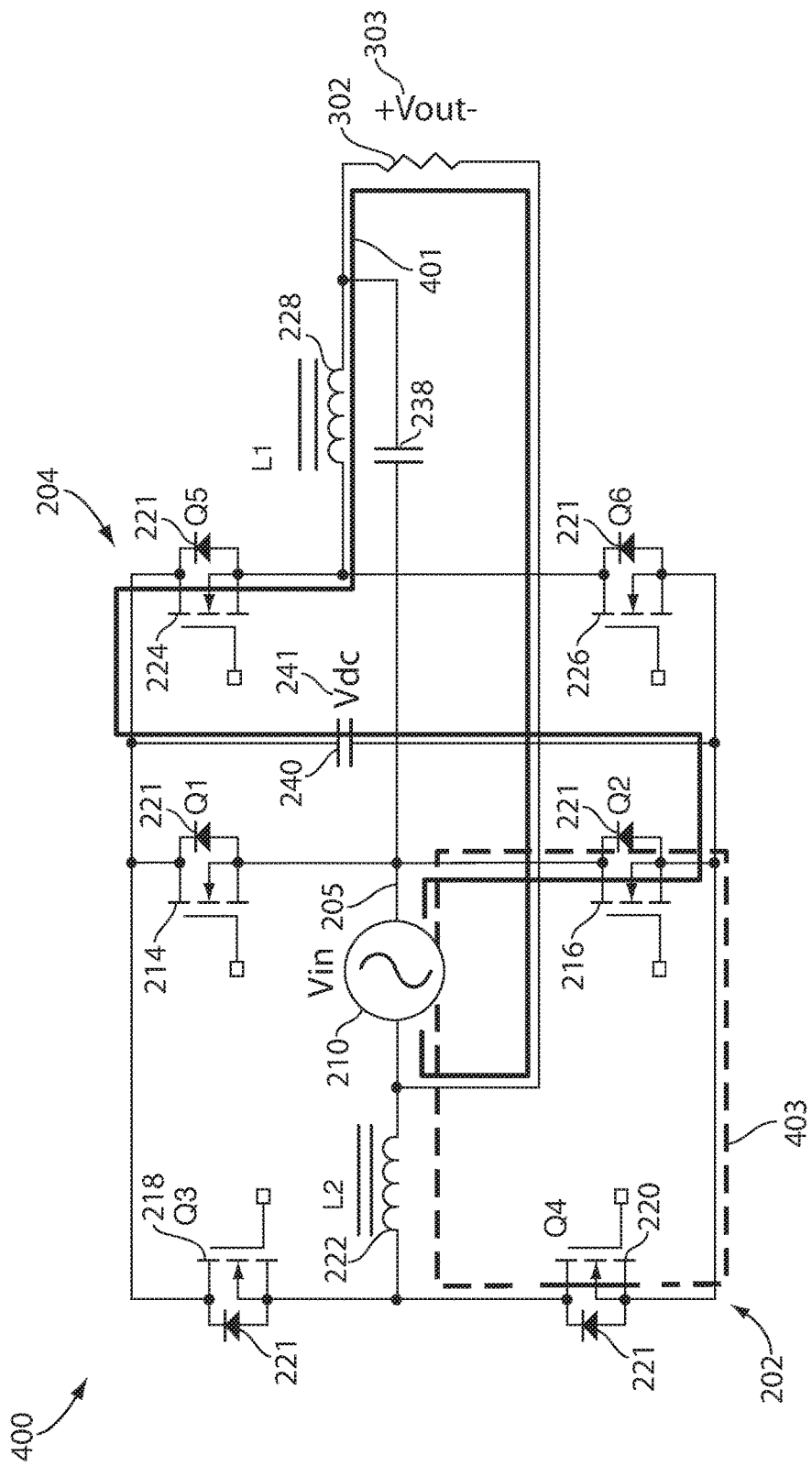
FIG. 4 is an equivalent circuit diagram of a single phase transformer-less delta conversion rectifier in a second mode of operation according to aspects of the current invention.

FIG. 4 is an equivalent circuit diagram 400 of the single phase transformer-less delta conversion rectifier 200 in a second mode of operation according to aspects of the current invention. In response to a determination, by the controller 208, that the magnitude of the input voltage 210 (i.e., the sinusoidal input voltage waveform) is less than the magnitude of the desired output voltage waveform of the inverter 204, the controller 208 operates the inverter 204 in a boost mode. In the boost mode, the controller 208 transmits signals (e.g., low signals) to switches Q1 214 and Q6 226 to turn the switches off and transmits signals (e.g., pulses) to switches Q2 216 and Q5 224 to convert the input voltage 210 waveform into an output voltage waveform having a magnitude greater than the input voltage 210. For example, as shown by the solid line 401 in FIG. 4, by turning on switches Q2 216 and Q5 224 for a duty ratio of d, the controller 208 operates the inverter 204 to combine the input voltage ($V_{in}$) 210 with voltage ($V_{dc}$) 241 across the fourth capacitor 240 to generate the desired AC output voltage ($V_{out}$) 303 having a magnitude greater than the magnitude of the input voltage 210. In the boost mode of operation, the AC output voltage ($V_{out}$) 303 is given by:

$$V_{out}=V_{in}+V_{dc}*d.$$

Also in the boost mode of operation, the controller 208 operates the active power filter 202 to provide PFC at the input 205 of the rectifier 200. For example, as shown by the dashed line 403 in FIG. 4, the controller 208 operates the switches Q2 216 and Q4 220 to control current at the input 205 of the rectifier 200 to provide PFC.

Figure 5:
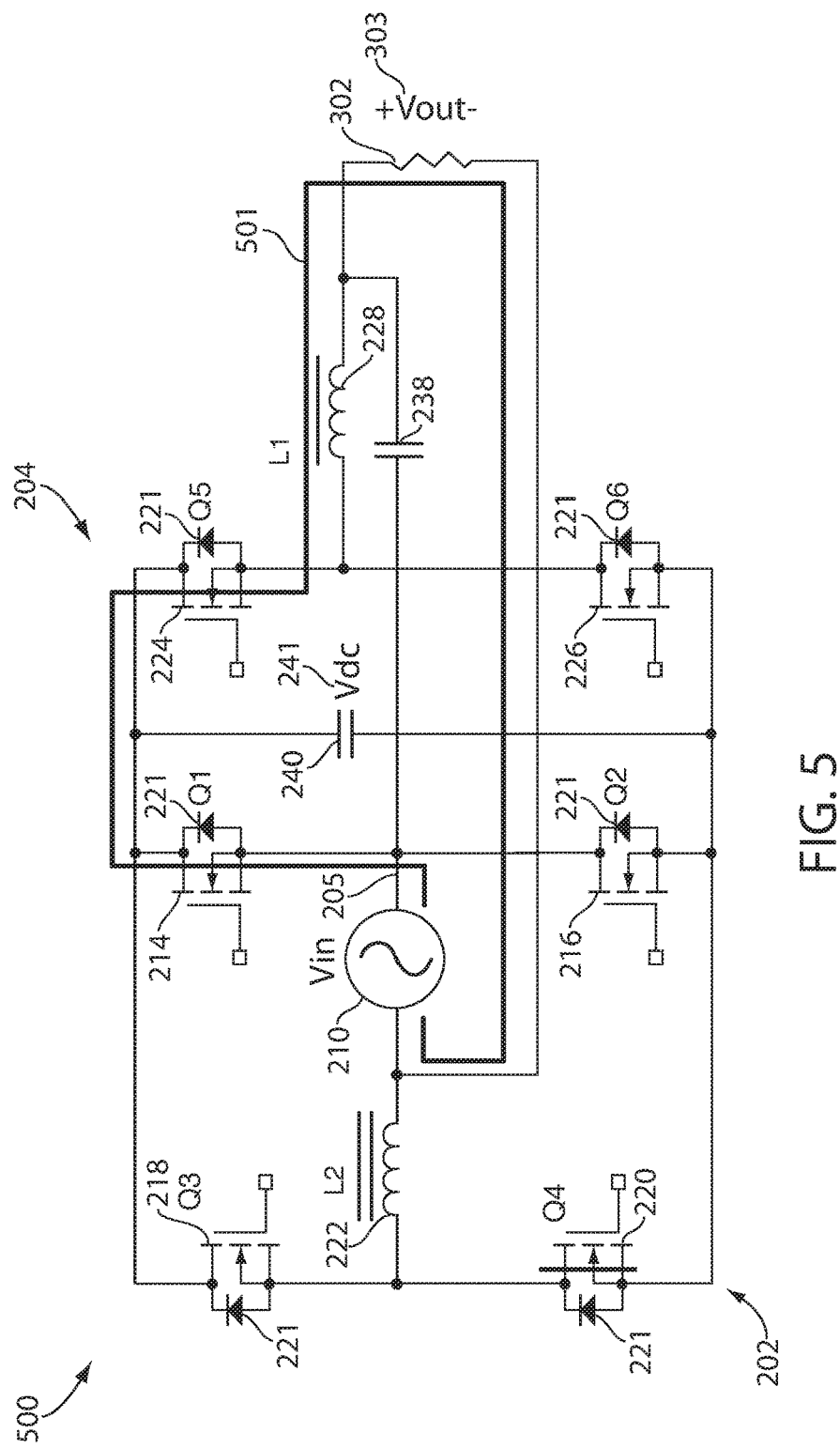
FIG. 5 is an equivalent circuit diagram of a single phase transformer-less delta conversion rectifier in a third mode of operation according to aspects of the current invention.

FIG. 5 is an equivalent circuit diagram 500 of the single phase transformer-less delta conversion rectifier 200 in a third mode of operation according to aspects of the current invention. In response to a determination, by the controller 208, that the input voltage 210 (i.e., the sinusoidal input voltage waveform) is positive and at the same magnitude as a desired output voltage waveform, the controller 208 transmits signals (e.g., low signals) to switches Q2 216 and Q6 226 to turn the switches off and transmits signals (e.g., high signals) to switches Q1 214 and Q5 224 to turn the switches on. As shown by the solid line 501 in FIG. 5, once switches Q1 214 and Q5 224 are turned on, the positive input voltage 210 is provided to the load 302, via switches Q1 214 and Q5 224, as the desired output voltage 303. Because the input voltage 210 is provided directly to the load 302, operation of the active power filter 202 to provide PFC may be unnecessary.

Figure 6:
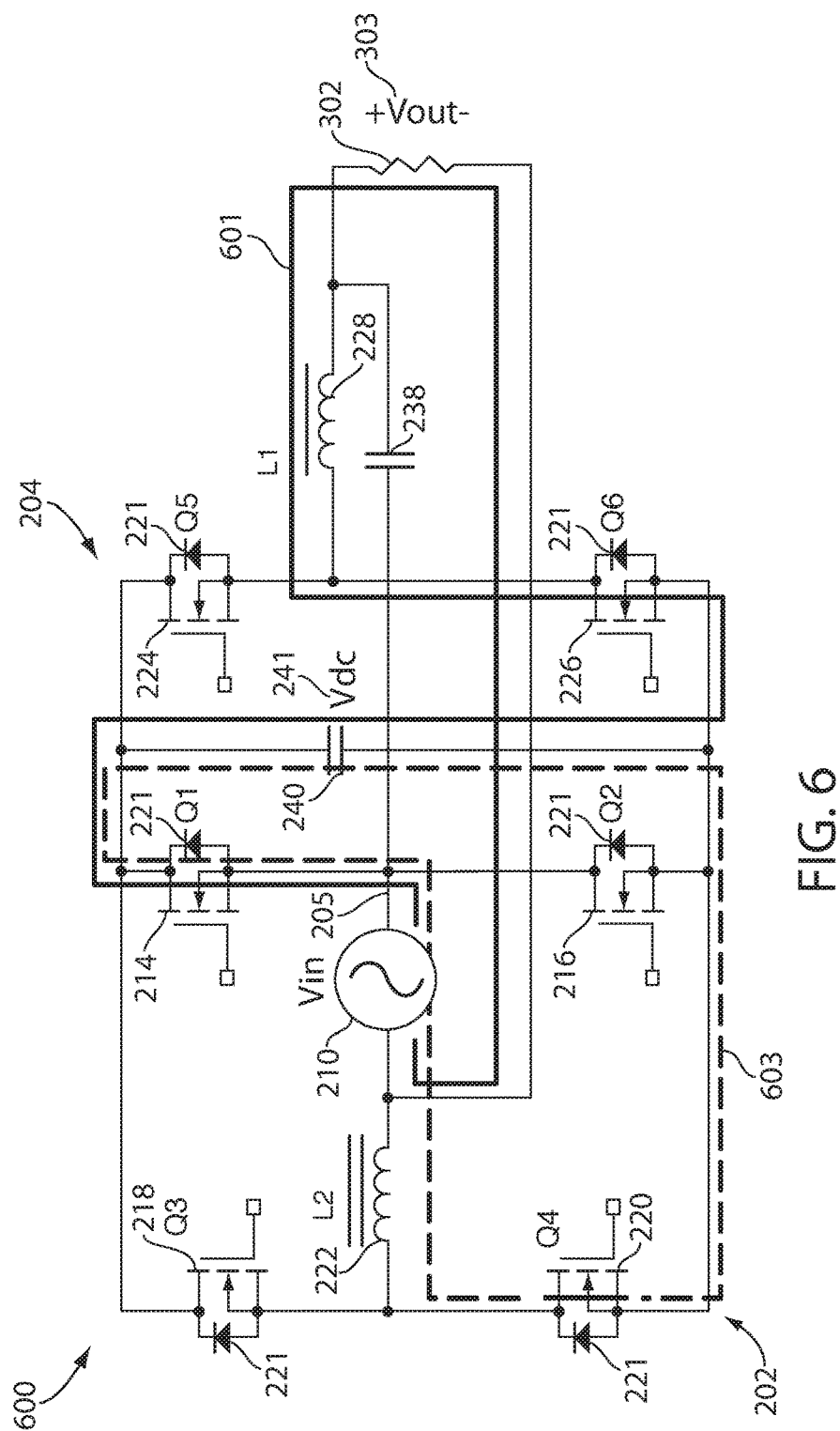
FIG. 6 is an equivalent circuit diagram of a single phase transformer-less delta conversion rectifier in a fourth mode of operation according to aspects of the current invention.

FIG. 6 is an equivalent circuit diagram 600 of the single phase transformer-less delta conversion rectifier 200 in a fourth mode of operation according to aspects of the current invention. In response to a determination, by the controller 208, that the magnitude of the input voltage 210 (i.e., the sinusoidal input voltage waveform) is greater than the magnitude of the desired output voltage waveform of the inverter 204, the controller 208 operates the inverter 204 in a buck mode. In the buck mode, the controller 208 transmits signals (e.g., low signals) to switches Q2 216 and Q5 224 to turn the switches off and transmits signals (e.g., pulses) to switches Q1 214 and Q6 226 to convert the input voltage 210 waveform into an output voltage waveform having a magnitude less than the input voltage 210. For example, as shown by the solid line 601 in FIG. 6, by turning on switches Q1 214 and Q6 226 for a duty ratio of d, the controller 208 operates the inverter 204 to store a portion of the energy provided to the input 205 of the rectifier 200 across the fourth capacitor 240 to generate the desired AC output voltage ($V_{out}$) 303 having a magnitude less than the magnitude of the input voltage 210. The energy stored on the fourth capacitor 250 results in a voltage ($V_{dc}$) 241 across the fourth capacitor. In the buck mode of operation, the AC output voltage ($V_{out}$) 303 is given by:

$$V_{out}=V_{in}-d*V_{dc}.$$

Also in the buck mode of operation, the controller 208 operates the active power filter 202 to provide PFC at the input 205 of the rectifier 200. As shown by the dashed line 603 in FIG. 4, the controller 208 operates the switches Q1 214 and Q4 220 to control current at the input 205 of the rectifier 200 to provide PFC. For example, unlike other converters which draw pulsating current from an input voltage source in a buck mode (as discussed above), the controller 208 may operate the active power filter 202 (i.e., the switches Q1 214 and Q4 220) to maintain sinusoidal current at the input 205 of the rectifier 200, even if the output current of the rectifier 200 is non-sinusoidal. By preventing pulsating current at the input 205 of the rectifier 200, EMI filters which are typically used to handle pulsating input current may not be required.

As the inverter 204 of the rectifier 200 is in series with the input 205 of the rectifier (having voltage ($V_{in}$)), most of the power drawn by the load 302 is provided directly from the input 205 of the rectifier 200. This is similar to how a traditional transformer-based delta conversion UPS operates (as discussed above) except that with the rectifier 200, a bulky line frequency (e.g., 50/60 Hz) transformer is not required. The elimination of the line frequency transformer may improve power efficiency and reduce cost of the rectifier 200. In addition, the efficiency of the rectifier 200 may further be improved as the rectifier does not require double conversion (as typically performed in other types of converters discussed above).

As described above, the single phase transformer-less delta conversion rectifier 200 is one of the three rectifier sections (e.g., rectifier sections 104-106 as shown in FIG. 1) of a 3-phase transformless delta conversion rectifier 100. However, in other embodiments, the single phase transformer-less delta conversion rectifier 200 may stand alone and receive power from a single phase power source.

According to one embodiment, the output voltage of the rectifier 100 is +−190 Vdc; however, in other embodiments, the output voltage of the rectifier 100 may be configured differently.

According to one embodiment, a transformer-less delta conversion rectifier (100 or 200 as discussed above) is the front end of an AC UPS. For example, in one embodiment, a transformer-less delta conversion rectifier within an AC UPS is coupled to an inverter via a DC bus and provides DC power to the DC bus. In another embodiment, a transformer-less delta conversion rectifier is the front end of a DC UPS and provides DC power to a DC bus of the DC UPS.

As described above with regard to FIG. 2, the first terminal of the second inductor 228 is coupled to the source of the fifth switch (Q5) 224 and a second terminal of the second inductor 228 is coupled to the source of the first switch (Q1) 214 via a third capacitor 238. However, in another embodiment, the first terminal of the second inductor 228 is coupled to the source of the fifth switch (Q5) 224 and a second terminal of the second inductor 228 is coupled to neutral 223 via the third capacitor 238.

As described above, a transformer-less delta conversion rectifier is provided that maintains a constant DC output while also maintaining high power factor and avoiding the bulky EMI filter, double conversion, and bulky line frequency transformer problems of traditional converters.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An AC-DC rectifier comprising:
   an input configured to be coupled to an AC power source and to receive input AC power from the AC power source having an input AC voltage waveform;
   an output configured to provide output DC power to a load;
   an active power filter coupled to the input;
   a converter coupled to the input and configured to convert the input AC voltage waveform into an output AC voltage waveform at a desired magnitude;
   a rectifier portion coupled between the converter and the output and configured to convert the output AC voltage waveform into the output DC power; and
   a controller coupled to the input, the active power filter, and the converter and configured to operate the active power filter to provide Power Factor Correction (PFC) at the input, to operate the converter to provide the output AC voltage waveform at the desired magnitude to the rectifier portion, and to monitor a magnitude of the input AC voltage waveform and compare the magnitude of the input AC voltage waveform to the desired magnitude of the output AC voltage waveform,
   wherein the controller is further configured to operate the converter in a buck mode of operation in response to a determination that the magnitude of the input AC voltage waveform is greater than the desired magnitude of the output AC voltage waveform.

2. The AC-DC rectifier of claim 1, wherein the input is further configured to be coupled to a 3-phase AC power source and to receive one phase of 3-phase power provided by the 3-phase AC power source.

3. The AC-DC rectifier of claim 1, wherein the active power filter is a full-bridge active power filter including a first plurality of switches.

4. The AC-DC rectifier of claim 3, wherein the converter is a full-bridge converter including a second plurality of switches.

5. The AC-DC rectifier of claim 4, wherein at least one switch of the first plurality of switches is also included in the second plurality of switches.

6. The AC-DC rectifier of claim 1, wherein the controller is further configured to operate the converter in a boost mode of operation in response to a determination that the magnitude of the input AC voltage waveform is less than the desired magnitude of the output AC voltage waveform.

7. The AC-DC rectifier of claim 1, wherein the controller is further configured to operate the active power filter to maintain sinusoidal current at the input.

8. The AC-DC rectifier of claim 1, further comprising a capacitor coupled in parallel with the converter.

9. The AC-DC rectifier of claim 1, wherein the rectifier portion is further configured to be coupled to a DC bus of a UPS.

10. A method for operating an AC-DC rectifier, the AC-DC rectifier comprising an input configured to be coupled to an AC power source and an output configured to provide output DC power to a load, the method comprising acts of:
    receiving, at the input from the AC power source, input AC power having an input AC voltage waveform;
    monitoring a magnitude of the input AC voltage waveform;
    comparing the magnitude of the input AC voltage waveform to the desired magnitude of the output AC voltage waveform;
    operating, with a controller, an active power filter, to control current at the input to provide PFC;
    operating, with the controller, a converter to convert the input AC voltage waveform into an output AC voltage waveform at a desired magnitude; and
    rectifying the output AC voltage waveform into the output DC power,
    wherein the act of operating the converter to convert the input AC voltage waveform into the output AC voltage waveform includes operating the converter in a boost mode of operation in response to a determination that the magnitude of the input AC voltage waveform is less than the desired magnitude of the output AC voltage waveform.

11. The method of claim 10, wherein the AC power source is a 3-phase power source, and wherein the act of receiving input AC power includes receiving one phase of 3-phase power provided by the 3-phase power source.

12. The method of claim 10, wherein the active power filter is a full-bridge active power filter including a plurality of switches, and wherein the act of controlling current at the input includes adjusting a duty ratio of at least one switch of the plurality of switches to draw desired current from the AC power source.

13. The method of claim 12, wherein the act of adjusting the duty ratio of at least one switch of the plurality of switches includes adjusting the duty ratio of the at least one switch of the plurality of switches to maintain sinusoidal current at the input.

14. The method of claim 10, wherein the converter is a full-bridge converter including a plurality of switches, and wherein the act of converting the input AC voltage waveform into the output AC voltage waveform includes adjusting a duty ratio of at least one switch of the plurality of switches to generate the output AC voltage waveform at the desired magnitude.

15. The method of claim 14, wherein operating the converter in the boost mode of operation includes operating the plurality of switches in the boost mode of operation in response to the determination that the magnitude of the input AC voltage waveform is less than the desired magnitude of the output AC voltage waveform.

16. The method of claim 14, wherein the act of operating the converter to convert the input AC voltage waveform into the output AC voltage waveform includes operating the plurality of switches in a buck mode of operation in response to a determination that the magnitude of the input AC voltage waveform is greater than the desired magnitude of the output AC voltage waveform.

17. An AC-DC rectifier comprising:
a plurality of rectifier sections, each configured to receive AC power from one phase of a 3-phase AC power source, each rectifier section comprising:
   an input configured to receive one phase of the 3-phase AC power having an input AC voltage waveform; and
   means for providing PFC at the input, for monitoring a magnitude of the input AC voltage waveform, for converting, in a boost mode of operation in response to the magnitude of the input AC voltage waveform being less than a desired magnitude of an output AC voltage waveform, the input AC voltage waveform into the output AC voltage waveform at the desired magnitude, and for converting, in a buck mode of operation in response to the magnitude of the input AC voltage waveform being greater than the desired magnitude of the output AC voltage waveform, the input AC voltage waveform into the output AC voltage waveform at the desired magnitude;
an output configured to provide output DC power to a load; and
a rectifier portion coupled to the output and configured to convert the output AC voltage waveform from each one of the plurality of rectifier sections into the output DC power.

* * * * *